May 21, 1968   J. COZZA ET AL   3,384,083
TREATMENT DEVICE
Filed Feb. 15, 1966   2 Sheets-Sheet 1

INVENTORS
JOHN COZZA
MERRITT FRIEDMAN
DONALD C. LINDLEY

BY Leonard H. King
ATTORNEY

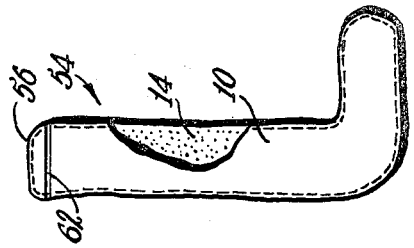
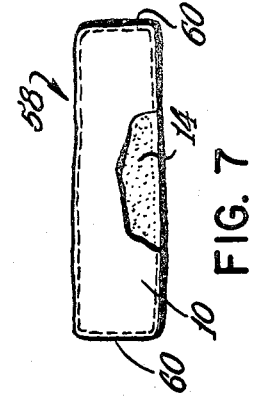
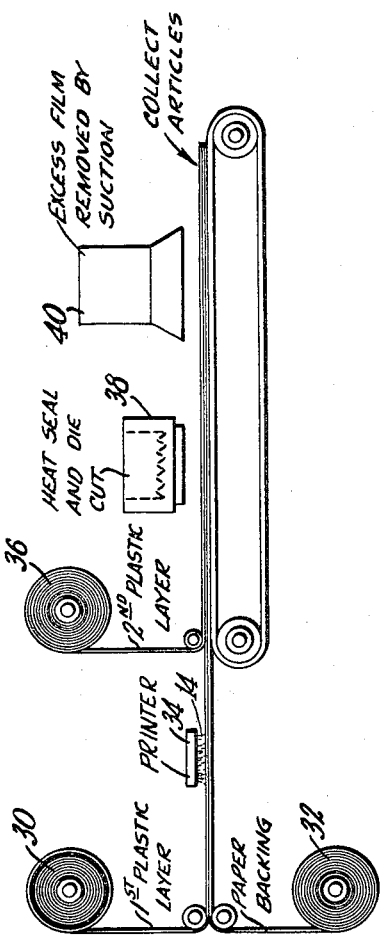
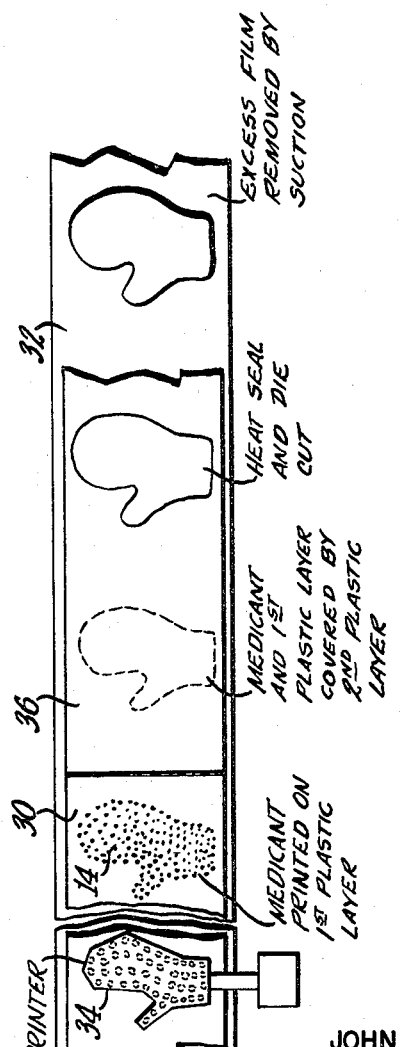

3,384,083
TREATMENT DEVICE
John Cozza, Cold Spring Harbor, Merritt Friedman, Brooklyn, and Donald C. Lindley, Greenlawn, N.Y., assignors to Cellu-Craft Inc., New Hyde Park, N.Y.
Filed Feb. 15, 1966, Ser. No. 527,718
12 Claims. (Cl. 128—260)

This invention relates generally to hollow plastic articles such as gloves, boots or the like that are adapted to encase a human limb, and more particularly to the combination such articles and a medicant on the inside thereof and the method of forming same.

Plastic gloves are presently being made by feeding a continuous length of material such as polyethylene or other heat sealable film past dies that heat seals two layers of film and blanks out the desired shape therefrom. Preferably the plastic film is provided with a paper backing member during the fabrication of the article. It has been found that when medicants are placed on the inside of a glove formed as described above a convenient and effective method of treating skin and other conditions is provided. Since the plastic is substantially non-porous, there is no circulation of air through the glove. Normal body heat generated when the glove is worn will be retained and will open the pores of the skin. This action permits the rapid absorption of the medicant into the skin.

The description of the present invention will be, for convenience, directed towards plastic gloves having a medicant such as glycerine printed on the inside thereof. It is to be understood, however, that other articles such as boots or sleeves may be made. Further, several different methods of manufacture will be described. Various optional features such as the inclusion of tear strips and sealing means for an antiseptic product will be explained as well as their inclusion in the manufacturing process.

Accordingly, it is an object of this invention to provide an improved method for manufacturing a hollow plastic article of apparel with a medicant on the inside thereof.

Another object is to provide an improved method of incorporating a medicant on the inside of a sealed, hollow plastic article of apparel.

A further object is to provide a method of forming, from a single length of continuous plastic film, an article of apparel having a medicant on the inside surface.

An additional object is to provide a method of forming, from a pair of continuous, superimposed plastic film layers, an article of apparel having a medicant between the layers thereof.

A particular object is to provide a tubular article of apparel having a medicant on the inside thereof.

Still another object of this invention is to provide a plastic glove having a medicant on the inside thereof.

Yet another object is to provide a plastic boot having a medicant on the inside thereof.

A further object is to provide a plastic sleeve having a medicant on the inside thereof.

These and other features, objects and advantages of the invention will, in part, be pointed out with particularity and will, in part, become obvious from the following more detailed description of the invention, taken in conjunction with the accompany drawing, which forms an integral part thereof.

In the various figures of the drawing, like reference characters designate like parts.

In the drawings:

FIG. 3 is a schematic side elevational view illustrating the various steps involved in a second, alternative embodiment of the manufacturing method comprising the instant invention;

FIG. 4 is a fragmentary schematic plan view of portions of the process shown in FIG. 3;

FIG. 6 is a plan view of another article that may be formed by either of the aforementioned process embodiments; and FIG. 7 is a plan view of yet another article that may be formed by either of the aforementioned process embodiments.

Figure 1:
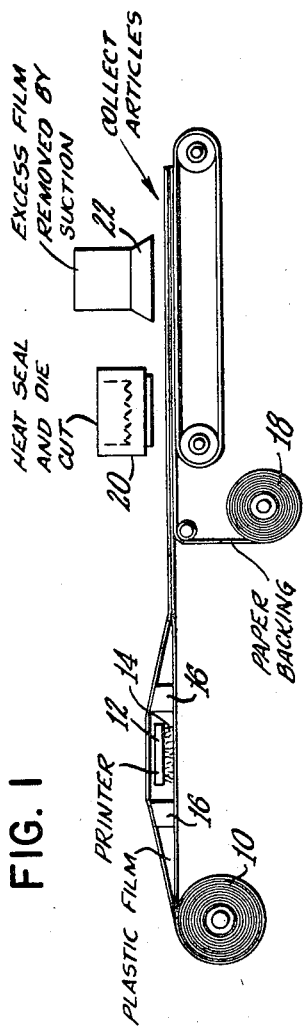
FIG. 1 is a schematic side elevational view illustrating the various steps involved in one embodiment of the manufacturing method comprising this invention.
Figure 2:
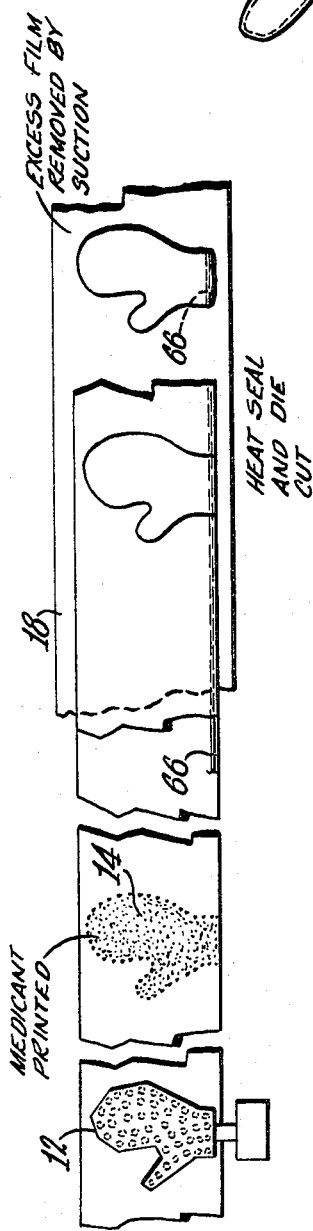
FIG. 2 is a fragmentary schematic plan view of portions of the process shown in FIG. 1.

Refering now to the drawing, FIG. 1 and FIG. 2 illustrate one embodiment of this invention as applied to the manufacture of a mitten (FIG. 5A) having a medicant printed on the inside surface thereof. Supply roll 10 contains a continuous length of folded thermoplastic film, each layer of which is in the order of 1½ mils thick. The film may be polyethylene, polypropylene, Mylar, nylon, vinyl resins such as polyvinylidene chloride, polyvinyl chloride, polyvinyl acetate and their mixtures or copolymers and the like film forming resins. Materials such as Mylar and nylon are preferred where a barrier is required for the medicants. The Mylar and nylon need only be ½ mil thick, whereas polyethylene, which is not an effective barrier for certain medicants, would have to be 1–2 mils thick. Still other combinations of suitable materials would be polyethylene coated substrates such as paper, metal foil, Mylar, nylon, fabrics, etc.

Suitable means drive the film past a printing device 12 which at timed intervals applies a pattern of a medicant 14 on the film. Preferably the medicant is of a type which can be sprayed on and which will set to a gel or solid state. Such materials are well known. The pattern may be a series of dots, lines or a solid pattern. Glycerine, for example, may be used as the medicant. As shown particularly in FIG. 2, the medicant is contained within the outline of a mitten. It is to be understood that glycerine is used by way of example only and that other medicinal materials that lend themselves to printing may also be used.

Separator 16 holds the layers of the two-ply film apart while the printer in the form of a multi-apertured nozzle 12 applies the medicant. As is shown schematically in FIG. 2, the nozzle is comprised of a chamber having a plurality of apertures positioned over the bottom layer of film. A puff of air will dispense the medicant in the desired pattern. After the folded film has been printed, a layer of backing paper from supply roll 18 is placed thereunder. At the next station combination die cutting and heat sealing means 20 forms a concentric pattern of a mitten about the medicant. The mitten is thereby separated from the remainder of the film. Suction means 22 removes the scrap film from the paper base after the cutting and sealing step, leaving just the mitten on the paper. The paper base and the mitten are then collected in any suitable manner.

A second embodiment of this invention requires the feeding of two separate layers of film plus a base layer of paper. With reference to FIG. 3 and FIG. 4, first film supply roll 30 and base paper supply roll 32 feed layers to printing means 34 whereby the medicant is applied to the thermoplastic film. A second or upper plastic film layer is applied by supply roll 36 after the medicant has been printed on the film. Combination heat sealing and die cutting means 38 form the mitten pattern in both film layers, whereupon suction means 40 removes the excess film. As in the previous embodiment, the paper backing and the mittens may now be collected.

Figure 5:
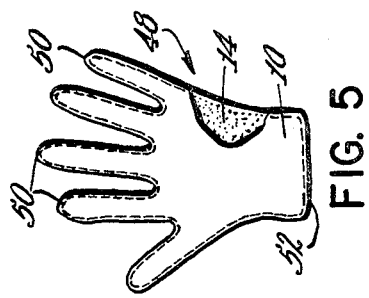
FIG. 5 and FIG. 5A are plan views of related articles formed by either of the aforementioned process embodiments.
Figure 5A:
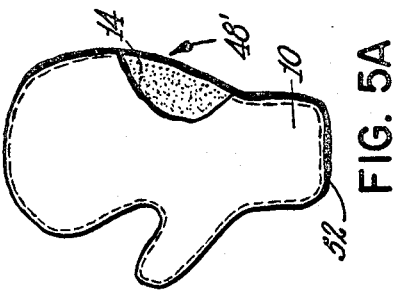

FIGS. 5, 5A, 6 and 7 illustrate four products that may be formed by either of the aforementioned embodiments. The articles 48 and 48', shown in FIG. 5 and FIG. 5A, are adapted to be worn on the hand and may be either in mitten form or may have finger portions 50, as does a glove. The glove or mitten is initially sealed along its entire periphery and is adapted to be opened at the base portion 52 for insertion of the hand. In FIG. 6 boot 54 is intended to cover the leg as well as the foot. The boot may, of course, be made smaller to cover just the foot. In either event base portion 56 is openable to permit entry of the limb. The sleeve member 58 illustrated in FIG. 7 has both end portions 60 openable so that it may be worn over the knee or elbow. In a smaller size it could be worn on a finger if it is necessary to so localize the treatment.

Both embodiments of the process described hereinabove have particular utility where it is desired to keep the medicated contents of the article perfectly sterile. For this purpose the article is heat sealed around its entire periphery. However, it is desirable to include simplified means for opening the article. Any of the conventional tear strips may be employed. Briefly, as shown by way of example in FIG. 6, at least one reduced thickness strip 62 is formed in the thermoplastic sheet. The plastic may readily be torn along this line.

Still another form of opening means is shown in FIG. 2. A tear strip 66, in the form of a continuous piece of heat sealable string 66, is interposed between the two layers of film. In the first embodiment (FIG. 2) the tear string is fed concurrently with the folded film. In the second embodiment (FIG. 4) the string would be applied prior to the positioning of the upper film layer. The presence of the string does not affect the sterility of the article because the film is heat sealed around the string.

While the description given heretofore has been directed to an enclosed and sealed article that is inherently sterile, it is apparent that the invention need not be limited to such construction. For less critical applications, the base or end of the article need not be heat sealed. Thus, in FIG. 2, the article could either be positioned 180° from that shown so that the base is proximate the unfolded edge, or it could be positioned as shown and the base portion severed without heat sealing during the die cutting operation. In the embodiment of the invention shown in FIG. 4, the same construction would apply where it is not important that the interior of the article remain sterile.

When the article is applied to the user's limb, the open end is held close to the limb. It may either be taped or held in place by an elastic member. The considerable heat that is generated after a relatively short time will be retained because the article is non-porous. The action of the heat tends to open the pores of the skin and to liquify the medicant when a low melting point solid is employed. In this manner the medicant uniformly enters the skin. The exact dosage of medicant may easily be controlled during the printing step merely by applying more or less dots, for example. Thus a range of dosage sizes may easily be manufactured as well as a range of article sizes and shapes.

Having thus disclosed the best embodiment of the invention presently contemplated, it is to be understood that various changes and modifications may be made by those skilled in the art without departing from the spirit of the invention.

What is claimed is:
1. The method of forming a plastic article of apparel having a medicant on the inside surface thereof, said method comprising the steps of:
   (a) applying a medicant to one surface of a first layer of plastic sheet within a given area;
   (b) placing a second layer of plastic on the first plastic sheet whereby the medicant is positioned therebetween;
   (c) sealing the layers of plastic sheet together, said sealing being along a line spaced from said given area; and
   (d) cutting the sealed layers along a line that defines the periphery of the article.
2. The method in accordance with claim 1 wherein the first and second layers of plastic are a single sheet and wherein the second layer is placed on the first layer by longitudinally folding the sheet.
3. The method in accordance with claim 1 wherein the first and second layers of plastic are separate sheets and wherein the placing of the second sheet comprises the step of feeding a second layer of plastic in a direction parallel to and in a plane above the first layer.
4. The method in accordance with claim 1 wherein the article is sealed completely about the periphery thereof.
5. The method in accordance with claim 1 including the step of forming tearing means integral with the article.
6. The method in accordance with claim 1 wherein the step of applying the medicant comprises the step of printing the medicant.
7. An article of manufacture comprising, in combination:
   (a) first and second layers of plastic sealed to each other along the entire periphery thereof to define a hollow article adapted to be worn;
   (b) a medicant disposed on the inside surface of at least one of said plastic layers; and tearing means integral with said plastic layer proximate at least one end thereof whereby said article may be opened by pulling said tearing means.
8. The combination in accordance with claim 7 wherein said article defines a glove.
9. The combination in accordance with claim 7 wherein said article defines a mitten adapted to be worn on a human hand.
10. The combination in accordance with claim 7 wherein said article defines a boot adapted to be worn on a human foot.
11. The combination in accordance with claim 7 wherein said article is substantially tubular and of a size adapted to be worn on a human limb such as a leg, an arm or a finger.
12. The combination in accordance with claim 7 wherein said article is tubular and said tearing means is positioned proximate both ends thereof.

References Cited
UNITED STATES PATENTS

| | | | |
|---|---|---|---|
| 3,177,871 | 4/1965 | Meyers | 128—260 |
| 3,186,628 | 6/1965 | Rohde | 206—63.2 |
| 3,229,813 | 1/1966 | Crowe et al. | 206—63.2 |
| 3,294,230 | 12/1966 | Penksa | 206—63.2 |
| 3,342,182 | 9/1967 | Charos | 128—260 |

ADELE M. EAGER, *Primary Examiner.*